United States Patent
Topfer

(10) Patent No.: US 9,882,448 B2
(45) Date of Patent: Jan. 30, 2018

(54) DRIVE FOR AN ACTUATING UNIT

(71) Applicant: Kiekert Aktiengesellschaft, Heilegenhaus (DE)

(72) Inventor: Claus Topfer, Sindelfingen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 290 days.

(21) Appl. No.: 14/434,135

(22) PCT Filed: Sep. 27, 2013

(86) PCT No.: PCT/DE2013/000553
§ 371 (c)(1),
(2) Date: Apr. 24, 2015

(87) PCT Pub. No.: WO2014/056471
PCT Pub. Date: Apr. 17, 2014

(65) Prior Publication Data
US 2015/0263584 A1 Sep. 17, 2015

(30) Foreign Application Priority Data
Oct. 12, 2012 (DE) .................. 10 2012 218 651

(51) Int. Cl.
*H02K 11/02* (2016.01)
*H02K 5/22* (2006.01)
(Continued)

(52) U.S. Cl.
CPC ............. *H02K 5/22* (2013.01); *E05B 81/06* (2013.01); *E05B 81/25* (2013.01); *E05B 85/02* (2013.01);
(Continued)

(58) Field of Classification Search
CPC .......... H02K 5/22; H02K 5/225; H02K 11/00; H02K 11/02; H02K 11/024; H02K 11/026
(Continued)

(56) References Cited

U.S. PATENT DOCUMENTS 4,476,404 A * 10/1984 Bygdnes .............. G11B 5/5521
310/27
6,683,396 B2 * 1/2004 Ishida ...................... B25F 5/00
310/130
(Continued)

FOREIGN PATENT DOCUMENTS

DE        1159064 B     12/1963
DE         338394 A1    10/1989
(Continued)

OTHER PUBLICATIONS

Translation of 202009010787U1 by Total Patent Lexis Nexis on Apr. 22, 2015.
(Continued)

*Primary Examiner* — John K Kim
(74) *Attorney, Agent, or Firm* — Woodard, Emhardt, Moriarty, McNett & Henry LLP

(57) ABSTRACT

The invention relates to a drive for an actuating unit, especially for a power closing mechanism, preferably for a motor vehicle lock, comprising a motor housing part for accommodating an electric motor and a housing cover part for covering the motor housing part, a cable for electrically conducting current being electrically connected to a motor contact of the electric motor in the motor housing part and the cable comprising a diversion zone. The diversion zone of the cable is arranged outside or at least partially outside the housing. In this manner, the cable is not unduly bent during assembly when the housing is closed.

19 Claims, 3 Drawing Sheets

(51) Int. Cl.
    *E05B 81/06*     (2014.01)
    *E05B 81/24*     (2014.01)
    *E05B 85/02*     (2014.01)
    *H02K 15/14*     (2006.01)

(52) U.S. Cl.
    CPC ............ *H02K 5/225* (2013.01); *H02K 15/14* (2013.01); *Y10T 29/49009* (2015.01)

(58) Field of Classification Search
    USPC .......................................................... 310/71
    IPC ....................................................... H02K 11/02
    See application file for complete search history.

(56) References Cited

U.S. PATENT DOCUMENTS

| | | | |
|---|---|---|---|
| 6,851,509 B2* | 2/2005 | Hayakawa | B62D 5/0406 180/444 |
| 2005/0151432 A1* | 7/2005 | Kano | H02K 5/225 310/71 |
| 2013/0082552 A1* | 4/2013 | Shoji | F02N 11/04 310/71 |
| 2013/0082553 A1* | 4/2013 | Shoji | H02K 11/00 310/71 |
| 2015/0263584 A1* | 9/2015 | Topfer | E05B 81/06 310/71 |

FOREIGN PATENT DOCUMENTS

| | | |
|---|---|---|
| DE | 4419615 A1 | 12/1994 |
| DE | 202009010787 U1 | 1/2011 |
| EP | 84278 A1 | 7/1983 |

OTHER PUBLICATIONS

Translation of DE1159064 by Google Patent on Apr. 22, 2015.
Translation of DE4419615A1 by Total Patent Lexis Nexis on Apr. 22, 2015.
Translation of EP338394A1 by Total Patent Lexis Nexis on Apr. 22, 2015.
Translation of EP84278A1 by Total Patent Lexis Nexis on Apr. 22, 2015.

* cited by examiner

DRIVE FOR AN ACTUATING UNIT

CROSS-REFERENCE TO RELATED APPLICATIONS

This application is the U.S. national stage application of International Patent Application No. PCT/DE2013/000553, filed Sep. 27, 2013, which claims priority of German Application No. 10 2012 218 651.4, filed Oct. 12, 2012, which are both hereby incorporated by reference.

BACKGROUND

The invention relates to a drive for an actuating unit, especially for a power closing mechanism, preferably for a motor vehicle lock with the characteristics of the generic term of claim 1.

A drive for an actuating unit serves for impinging an actuator, acting on a connection means for impinging an actuating element. Such a drive for an actuating unit is known from printed matter DE 20 2009 010 787 U1, disclosing a power closing mechanism for a motor vehicle lock with a motor vehicle door lock serving as the actuating element and a Bowden cable as the connecting means.

A drive for an actuating unit contains a housing protecting and enclosing the drive motor. Generally, the housing is also used for fixing to a supporting element, such as a motor vehicle door. The motor is inserted into the housing during the installation of the drive. Cables inside the housing connect the motor to an electric connection module to which an energy source supplying the drive with power can be connected at a later stage.

In some drives for actuating units, especially in case of a power closing mechanism for a motor vehicle door lock, the connection contacts of the electric connection module are not arranged on the housing part of the housing accommodating the housing and the motor contact. This is, for instance the case when the connection module is accommodated in the housing cover. After insertion of the motor, the housing therefore remains initially open for connecting and installing the cables. During closing of the housing, an electric cable can, however, be bent excessively. The result can be kinking of the cable and potential cable defects.

SUMMARY

Unless specified differently below, the above characteristics of a drive for an actuating unit can individually or in combination be a part of the invention.

It is the task of the invention, of further developing a drive for an actuating unit of the aforementioned type.

The invention solves the task by providing a drive for an actuating unit with the characteristics of the first claim. Advantageous embodiments are disclosed in the sub claims. One sub claim refers to a method for installing the drive.

The task is solved by a drive for an actuating unit, especially a power closing mechanism, for preferably a motor vehicle door lock, containing a motor housing part for accommodating an electric motor and a housing cover part for covering the motor housing part, in which a cable electrically conducting current is electrically connected to a motor contact of the electric motor in the motor housing part and the cable contains a diversion zone. The diversion zone of the cable is arranged outside or at least partially outside of the housing.

The diversion zone is a cable section which is bent during closing of the housing as part of the installation.

Due to the diversion zone of the cable being arranged outside or at least partially outside of the housing, excessive bending of the cable can be prevented in a particularly easy manner. As a result, no additional work steps and/or components for preventing excessive bending of the cable are required.

In one embodiment of the invention the diversion zone of the cable extends around the common articulated axle of the motor housing part and the housing cover part, especially in close proximity to the articulated axle or optionally through the articulated axle.

The common articulated axle of the motor housing part and housing cover part describes the axis of rotation, around which the motor housing part and the housing cover part move towards each other for opening and closing during installation. Where both parts of the housing are moveably connected by a joint, the articulated axle corresponds to the axis of rotation of the joint. An axis of rotation or articulated axle does, however, also exist when both housing parts do not have an articulating connection but instead the housing cover part is, for instance, only supported by an outer edge on an edge area of the motor housing part for an opening and closing movement.

The arrangement of the diversion zone of the cable around the common articulated axle, especially in close proximity to the articulated axle or optionally through the articulated axle, ensures a particularly small change of the cable path during closing of the housing, as a result of which any excess cable length and thus any excessive bending of the cable can be avoided.

In one embodiment of the invention, the motor housing part contains a curvature for guiding the cable around the articulated axle in the diversion zone on the side of the articulated axle facing away from the electric motor, with the radius of the curvature being greater or equal to the permissible bending radius of the cable.

Bending radius refers to the most extreme curvature that can be assumed by a cable without any change to the properties of the cable. The permissible bending radius of a cable is generally provided by the manufacturer.

By guiding the cable around the articulated axle by means of a curvature with a radius greater or equal to the permissible bending radius it can be particularly easily prevented that the actual bending radius falls short of the permitted radius.

In one embodiment of the invention, the motor housing part contains one or several ribs for restricting the lateral play of the cable in at least one part of the diversion zone.

Lateral play relates to the freedom of movement of a cable on a supporting surface transverse to the direction of the cable path.

The ribs allow particularly easy installation of the cable. As a result, any additional installation time for inserting the cable in the cable fixing means, such as clamp fixings, can be avoided. In addition, lateral ribs offer protection for the cable and prevent the cable from reaching any ledges close-by on which the cable could get stuck.

In one embodiment of the invention two ribs are arranged at least at such a distance that a lateral play of the cable is facilitated. The gap between the two ribs is thus greater than the diameter of the cable.

By laterally guiding the cable using the ribs allowing a certain play, it is particularly reliably ensured and without any faults, that the cable can at least partly counteract certain bending of the cable at another point though compensating movements.

In one embodiment of the invention, the rib of the motor housing part, in particular, contains a stop for limiting the rotating movement of the housing cover part during opening of the housing. The stop for limiting the rotating movement prevents excessive bending of the cable during installation.

In one embodiment of the invention, the motor housing part is designed in such a way that in the installed state, the motor contact of the electric motor is facing the articulated axle. By aligning the motor contact with the articulated axle, cable material can be saved and the electric motor and cable can be particularly easily and quickly installed.

In one embodiment of the invention, an opening is arranged in the motor housing part in such a way that the opening abuts the outside of the motor housing part tangentially to the curvature around the articulated axle. The opening in the motor housing part, tangentially abutting the curvature around the articulated axle, ensures that the cable connected to the motor, extends particularly straight, i.e. with particularly little bending through the opening and out of the motor housing part and can be guided around the articulated axle by means of the curvature.

In one embodiment of the invention, a U-shaped channel for accommodating the cable is provided whose depth is greater than the cable diameter. As a result of said inventive channel, the cable can be embedded and can thus be protected against the elements or components inside the housing.

In one embodiment of the invention, a U-shaped channel provides some lateral play for the cable. A U-shaped channel with lateral play for the cable offers the advantage that to a certain extent the cable can at least partially counteract bending of the cable at another point by compensating movements.

In one embodiment of the invention, the U-shaped channel in the diversion zone of the cable contains a curvature with a radius exceeding or equal to the permissible bending radius. As the result of the cable being positioned in a U-shaped channel with a curvature having a radius greater or equal the permissible bending radius it can be ensured that the bending radius does not fall below the permissible bending radius.

In one embodiment of the invention the curvature of the U-shaped channel contains an opening which is arranged in such a way that during closure of the housing as part of the installation, a cable in the diversion zone can extend from the curvature of the motor housing part through the opening in the curvature of the U-shaped channel into the U-shaped channel of the housing cover part. As a result of the inventive opening, an installation with a particularly small curvature of the cable at the transition between the motor housing part and the cover housing part in the diversion zone is made possible, In one embodiment of the invention, the U-shaped cable provides a stop for limiting the rotation of the housing cover part when the housing is opened for installation. The stop of the U-shaped channel of the housing cover part abutting against the stop of the rib of the motor housing part during opening of the housing can further prevent excessive bending of the cable during installation.

In one embodiment of the invention, the housing cover part provides a connection module for connecting a power source, providing a connecting contact for an electrical connection to the motor contact by means of the cable. The connecting module facilitates a particularly simple and fast installation of the drive.

In one embodiment of the invention, the U-shaped channel of the housing cover part ends in an area of a connecting contact of the connecting module. The inventive arrangement of the U-shaped channel, leading directly to the connecting contacts, provides a particularly good protection for the cable.

In one embodiment of the invention, the U-shaped channel of the housing cover part contains a cable fixing means for fixing the cable in the U-shaped channel, such as a clamp fixing. By providing one or more cable fixing means in the U-shaped channel it is ensured that the cable does not leave the U-shaped channel, as a result of, for instance, the force of gravity or centrifugal forces applied during opening and closing of the housing.

The cable fixing means have especially the shape of a barb with a barb arm and barb head. The elastic deformation of the barb arm during insertion of the cable generates a clamping force, clamping the cable between the barb arm and the side walls of the U-shaped channel. An outer phase on the barb head allows easy insertion of the cable in the cable fixing means. In addition, a shoulder of the barb head, acting as a retention area, counteracts any moving out of the cable fixing means and thus out of the U-shaped channel.

In one embodiment of the invention, a joint is provided, allowing moveable connection between the motor housing part and housing cover part around the articulated axle, preferably for a loose connection, in particular using an L-shaped articulated arm, and/or an O-shaped hinge pin. As a result of the moveable connection of the housing parts, using the joint, the drive can be particularly easily and quickly installed. A joint containing an L-shaped articulated arm and/or an O-shaped hinge pin can be easily provided.

In one embodiment of the invention, the L-shaped articulated arm on the housing cover part and the O-shaped hinge pin is provided on the motor housing part. As generally during installation the motor housing part is placed on the motor housing part from the top, an O-shaped hinge pin on the motor housing part provides a sturdy support and the L-shaped articulated arm on the housing cover part ensures a smooth rotation around the articulated axle. The complexity of production is thus advantageously reduced.

A further aspect of the invention relates to a method for installing a drive for an actuating unit, especially a power closing mechanism, preferably for a motor vehicle lock, containing a housing cover part accommodating an electric motor and a housing cover part covering the motor housing part, in which a cable for electric conducting of electricity is electrically connected to a motor contact of the electric motor in the motor housing part and in which the cable includes a diversion zone.

According to the method of the invention, a cable for electrically connecting a motor contact of the electric motor inside the motor housing part extends outside of the motor housing part and then around a common articulated axle of the motor housing part and housing cover part and finally enters the housing cover part.

As a result of the method of the invention, a drive for an actuating unit can be particularly easily and quickly installed, so that excessive bending of the cable can be avoided.

DETAILED DESCRIPTION OF THE DRAWINGS

Figure 1:
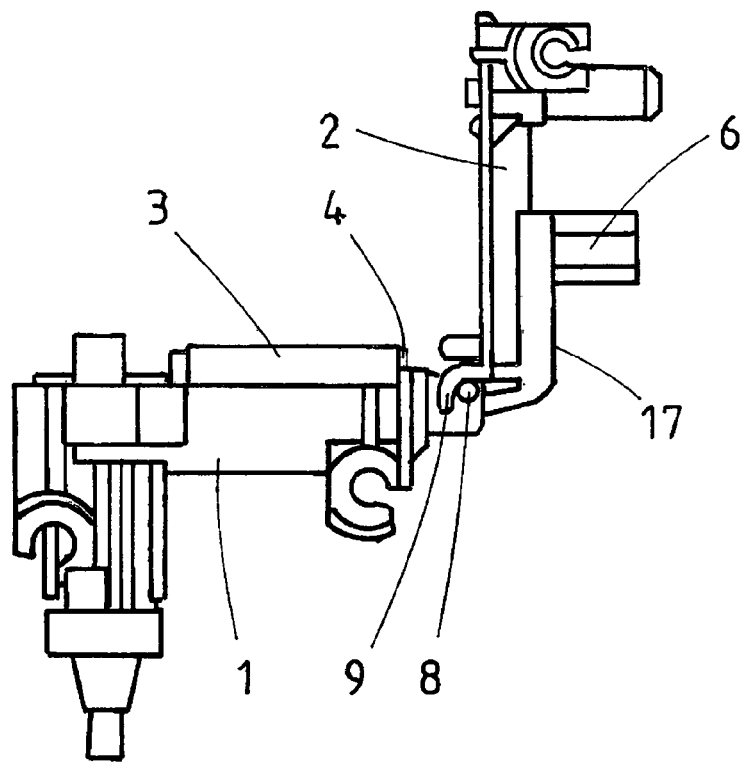
FIG. 1: shows a side view of the drive with an opened housing.

The characteristics disclosed as part of the below embodiments can be individually or in any combination combined with the objects of the claims.

The embodiment of the invention shown in FIGS. 1 to 5 consists of a drive for a power closing mechanism for a motor vehicle lock comprising a motor housing part 1 for accommodating an electric motor 3 and a housing cover part 2 for covering the motor housing part 1. The cables 5, 21 for electrically conducting power, electrically connect the two motor contacts 4 of the electric motor 3 in the motor housing part 1 to the two connection contacts 7 of the connection module 6. The cable 5 and the cable 21 are installed in the housing along the same cable route, i.e. the route of the cable intended by the guiding and fixing means and between the housing parts. The cable 5 and the cable 21 have the same design and are not connected or fixed to each other.

In order to facilitate installation, the housing cover part 2 and the motor housing part 1 are moveably connected by means of a joint, consisting of an O-shaped hinge pin 8 on the motor housing part 1 and an L-shaped articulated arm 9 on the housing cover part 2 loosely resting thereon (FIG. 1) and facilitating a rotating movement or an opening and closing movement around the articulated axle 10.

Figure 2:
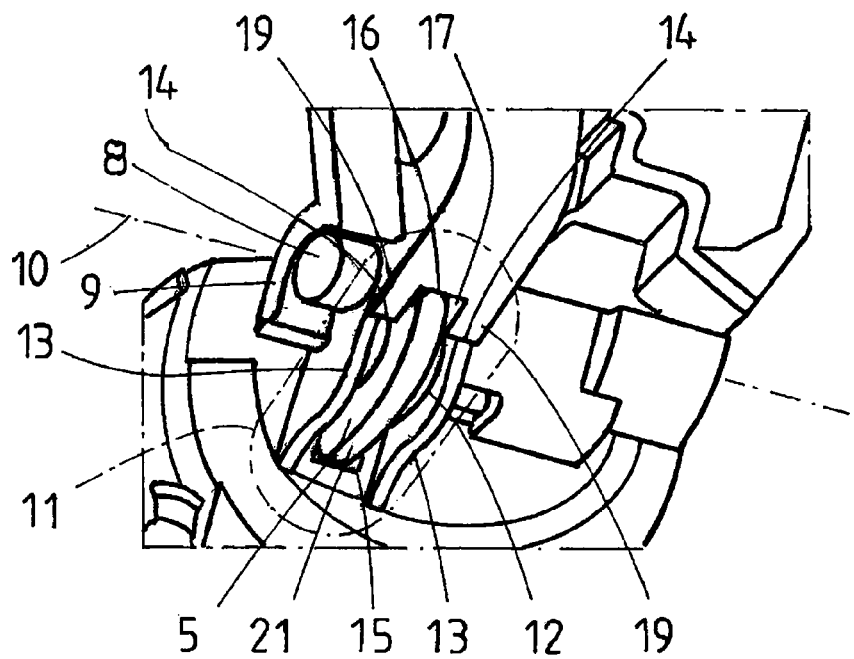
FIG. 2: shows an isometric view of the drive with an opened housing.
Figure 3:
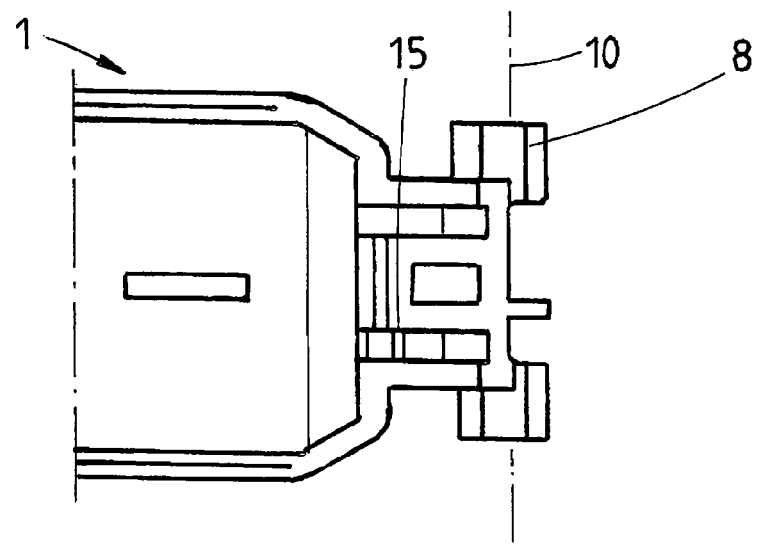
FIG. 3: shows a top view of a motor housing part.

The diversion zone 11 of the cable 5, 21 is partly arranged outside of the housing and extends by means of a curvature 12 on the motor housing part 1 on the side of the articulated axle 10 turned away from the electric motor 3 around the articulated axle 10 (FIG. 2). As the radius of the curvature 12 is greater than the permissible bending radius of the cable 5, 21, excessive bending of the cable 5, 21 can be avoided. The curvature 2 is offset to the articulated axle 10 in such a way that as a result of the curvature 2, the cables 5, 21 can extend in close proximity to the articulated axle 10 around the articulated axle 10 in the diversion zone 11 (FIG. 3). Consequently, closing of the housing results in a particularly small change to the cable route.

In the area of the curvature on the motor housing part 1, two ribs 13 are provided for restricting the lateral play of the cables 5, 21 when guiding the cables 5, 21 around the curvature 12. The ribs 13 are arranged at such a distance to each other that the cables 5, 21 have a certain lateral play. The ribs 13 also contain a stop 14 for restricting the rotation of the housing cover part 2 during opening of the housing for installation (FIG. 2).

Figure 4:
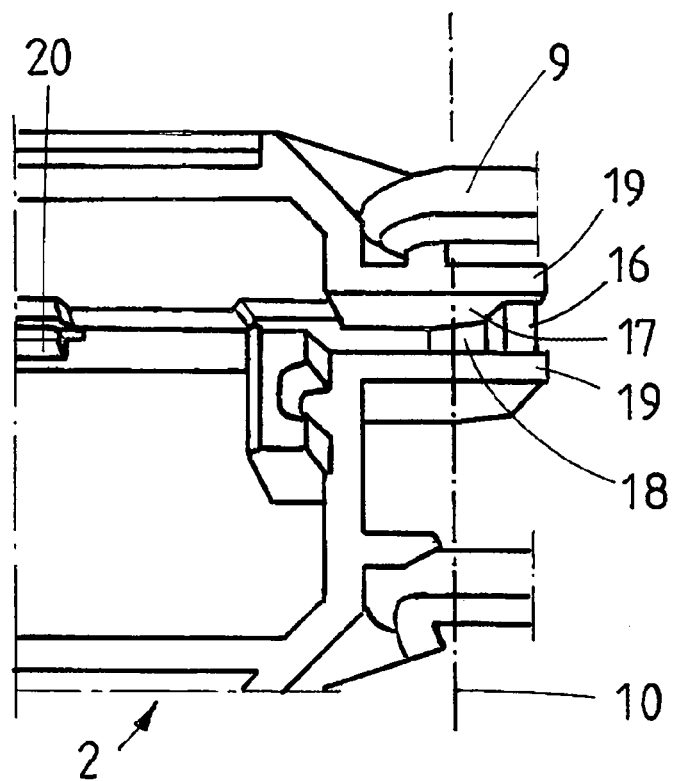
FIG. 4: shows an isometric view of the cover housing part.

The motor housing part 1 contains an opening 15 on the external side facing the motor contact 4, which tangentially abuts the curvature 12 of the motor housing part 1. The cables 5, 21 extend from the motor contacts 4 through the opening 15, along the curvature 12 around the articulated axle 10 and through the opening 16 in a U-shaped channel 17 of the housing cover part 2 in order to provide a protected seat of the cable 5, 21 inside the housing cover part 2 (FIG. 2). In the diversion zone 11 of the cables 5, 21, the U-shaped channel 17 contains a curvature 18 (FIG. 4). The radius of the curvature 18 exceeds the permissible bending radius of the cable 5, 21.

Figure 5:
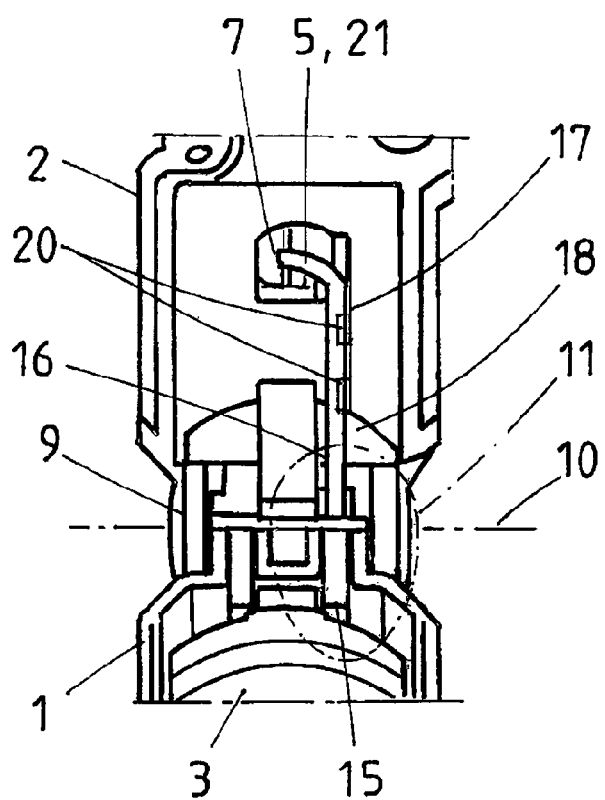
FIG. 5: shows an isometric view of the drive with an opened housing.

The cross section of the width and depth of the U-shaped channel 17 are both greater than the sum of diameters of the cable 5 and cable 21, providing a lateral play for the cables 5, 21 and also allowing the cables 5, 21 to be embedded in the U-shaped channel 17 for protection (FIG. 5). The U-shaped channel 17 also contains a stop 19 on the side featuring the opening 16, which in order to restrict the movement of rotation of the housing cover part 2 in relation to the motor housing part 1, can rest on the stop 14 of the ribs 13 when the housing is opened for installation (FIG. 2).

Inside the U-shaped channel 17 of the housing cover part 2, the cables 5, 21 are held in position by two cable fixing means 20 against the force of gravity or centrifugal forces applied during opening and closing of the housing and extend to the connection contacts 7 of the connecting module 6 (FIG. 5).

REFERENCE NUMBERS

1: Motor housing part
2: Housing cover part
3: Electric motor
4: Motor contact
5: Cable
6: Connection module
7: Connection contacts
8: Hinge pin
9: Articulated arm
10: Articulated axle
11: Diversion zone
12: Curvature (motor housing part)
13: Rib
14: Stop (motor housing part)
15: Opening (motor housing part)
16: Opening (housing cover part)
17: U-shaped channel
18: Curvature (housing cover part)
19: Stop (housing cover part)
20: Cable fixing means
21: Cable

The invention claimed is:

1. Drive for an actuating unit for a power closing mechanism-of a motor vehicle door lock, comprising a motor housing part for accommodating an electric motor and a housing cover part for covering the motor housing part, wherein the motor housing part and the housing cover part are rotateably connected to each other by a joint that includes a common articulated axle, a cable for electrically conducting current that is electrically connected to a motor contact of the electric motor in the motor housing part, wherein the cable extends from the motor housing part to the housing cover part and the cable comprises a diversion zone, wherein the diversion zone of the cable is arranged outside or at least partially outside of the motor housing and wherein the cable is arranged in such a way that the diversion zone extends around the common articulated axle of the motor housing part and the housing cover part.

2. Drive for an actuating unit according to claim 1, wherein the diversion zone extends around the common articulated axle of the motor housing part and housing cover part in immediate proximity to the articulated axle or optionally through the articulated axle.

3. Drive for an actuating unit according to claim 1, wherein a curvature on the motor housing part or a curvature on the housing cover part is designed in such a way that the cable extends on the side of the articulated axle facing away from the electric motor in the diversion zone around the articulated axle and/or that they have a radius greater or equal to the permissible bending radius of the cable.

4. Drive for an actuating unit according to claim 1, further comprising two ribs on the motor housing part for restricting lateral play of the cable at least in a part of the diversion zone wherein the two ribs are arranged at a distance to each other, that is optionally the same or preferably larger than a cable diameter of the cable.

5. Drive for an actuating unit according to claim 4, wherein the rib of the motor housing part containing a stop for restricting the movement of the housing cover part when opening the housing for installation.

6. Drive for an actuating unit according to claim 1, further comprising a U-shaped channel on the housing cover part for guiding the cable, especially with the U-shaped channel having a depth and/or width optionally the same or preferably greater than the diameter of the cable.

7. Drive for an actuating unit according to claim 6, wherein the end of the U-shaped channel facing the articulated axle contains an opening for entry of the cable in the U-shaped channel and/or curvature of the housing cover part.

8. Drive for an actuating unit according to claim 7, further comprising a stop on the housing cover part for restricting the rotation between the motor housing part and the housing cover part when opening the housing for installation, said stop being particularly arranged on the U-shaped channel or preferably on the curvature of the housing cover part.

9. Drive for an actuating unit according to claim 8, further comprising a connection module for connecting to a power source, especially containing a connection contact for electrically connecting especially to the motor contact of the electric motor by means of the cable.

10. Drive for an actuating unit according to claim 6, wherein the U-shaped channel of the housing cover part being arranged in such a way that the U-shaped channel, with the end facing away from the articulated axle, leads to the connection module, especially to the connection contact of the connection module.

11. Drive for an actuating unit according to claim 10, further comprising a cable fixing means for fixing the cable especially in the U-shaped channel.

12. Drive for an actuating unit according to claim 1, further comprising a hinge for connecting the motor housing part and the housing cover part, so that they are moveable around the articulated axle and preferably for a loose connection, especially using an L-shaped articulated arm and/or an O-shaped hinge pin.

13. Drive for an actuating unit according to claim 1, wherein a hinged arm is arranged on the housing cover part and/or the hinge pin on the motor housing part.

14. Drive for an actuating unit according to claim 1, wherein the motor contact of the electric motor is facing the articulated axle and/or that an opening is arranged in the motor housing part in such a way that the opening on the outside of the motor housing part tangentially rests on the curvature of the motor housing part.

15. Drive for an actuating unit according to claim 1, further comprising a connection module for connecting to a power source, especially containing a connection contact for electrically connecting especially to the motor contact of the electric motor by means of the cable.

16. Drive for an actuating unit according to claim 1, further comprising a connection module for connecting to a power source, especially containing a connection contact for electrically connecting especially to the motor contact of the electric motor by means of the cable.

17. Drive for an actuating unit according to claim 6, further comprising a stop on the housing cover part for restricting the rotation between the motor housing part and the housing cover part when opening the housing for installation, said stop being particularly arranged on the U-shaped channel or preferably on the curvature of the housing cover part.

18. Drive for an actuating unit according to claim 6, further comprising a cable fixing means for fixing the cable especially in the U-shaped channel.

19. Drive for an actuating unit for a power closing mechanism-of a motor vehicle door lock, comprising a motor housing part for accommodating an electric motor and a housing cover part for covering the motor housing part, in which a cable for electrically conducting current is electrically connected to a motor contact of the electric motor in the motor housing part and the cable comprises a diversion zone, wherein the diversion zone of the cable is arranged outside or at least partially outside of the motor housing, wherein the diversion zone of the cable is arranged in such a way that the diversion zone extends around a common articulated axle of the motor housing part and housing cover part, especially in immediate proximity to the articulated axle or optionally through the articulated axle, and wherein the motor contact of the electric motor is facing the articulated axle and/or that an opening is arranged in the motor housing part in such a way that the opening on the outside of the motor housing part tangentially rests on the curvature of the motor housing part.

* * * * *